Sept. 8, 1942. P. R. GOWEN 2,294,901
FUEL CONSUMPTION INDICATOR
Filed Dec. 18, 1939 3 Sheets-Sheet 1
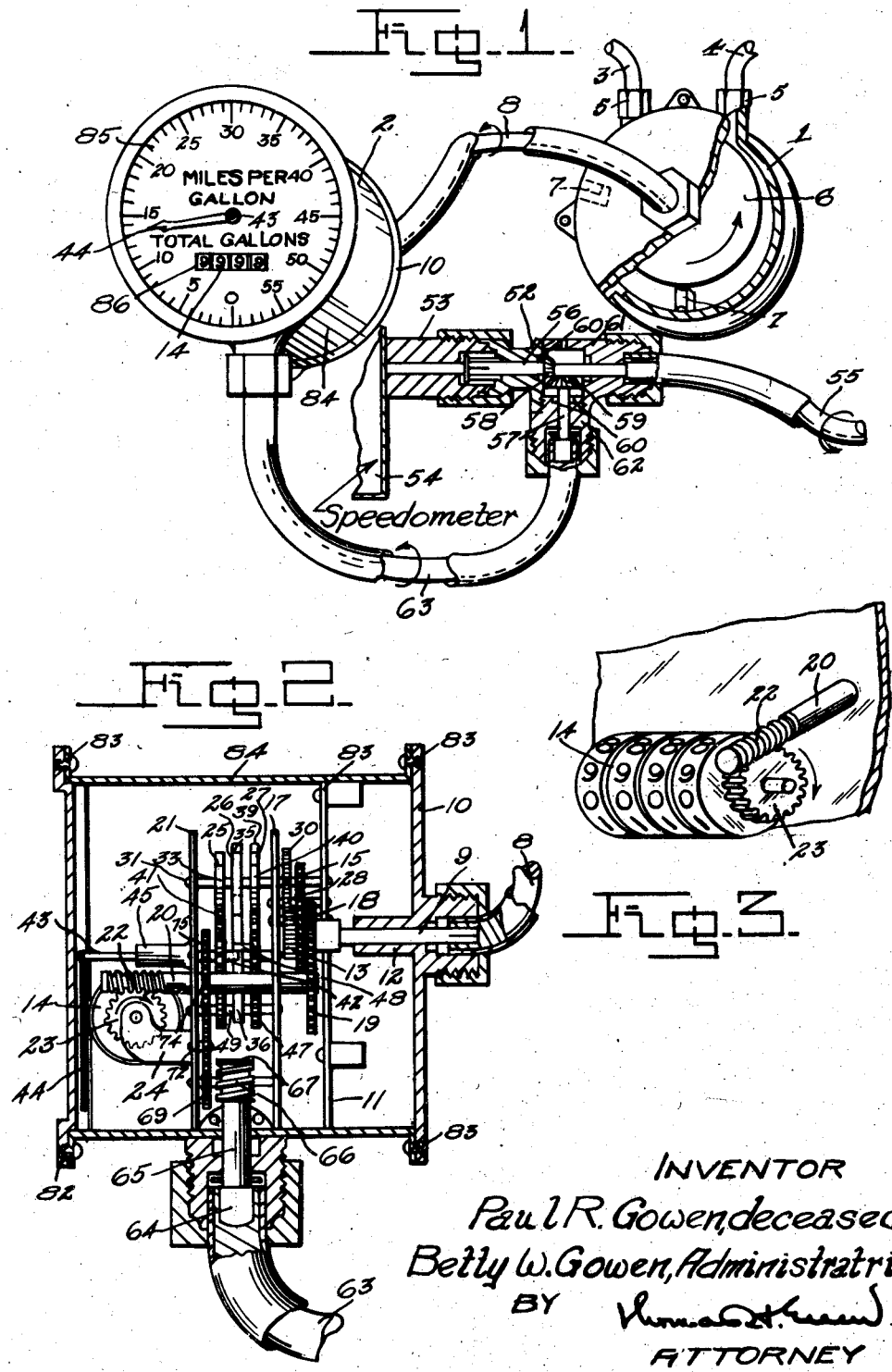
INVENTOR
Paul R. Gowen, deceased
Betty W. Gowen, Administratrix
BY
ATTORNEY

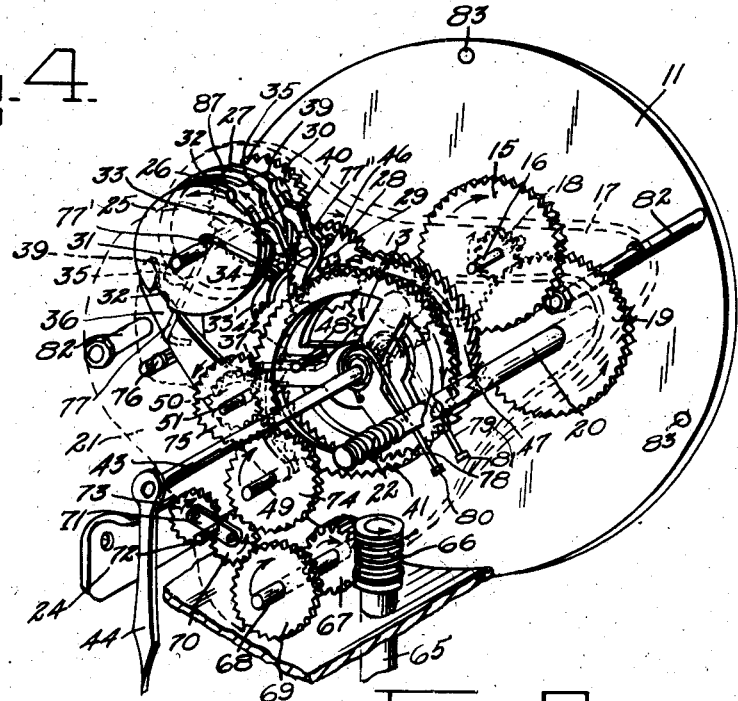

Sept. 8, 1942.　　　P. R. GOWEN　　　2,294,901
FUEL CONSUMPTION INDICATOR
Filed Dec. 18, 1939　　　3 Sheets-Sheet 3
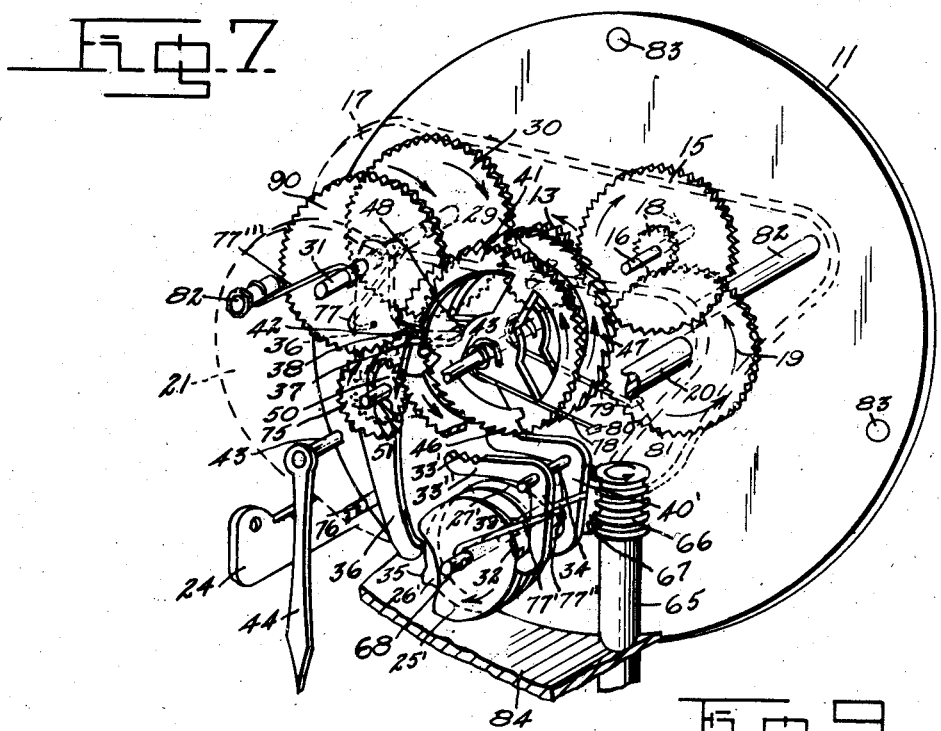
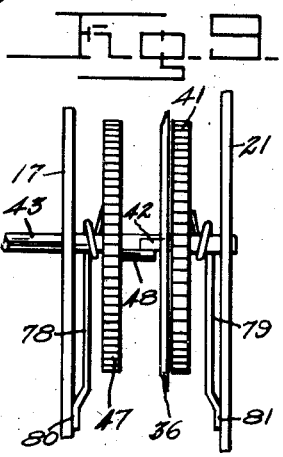
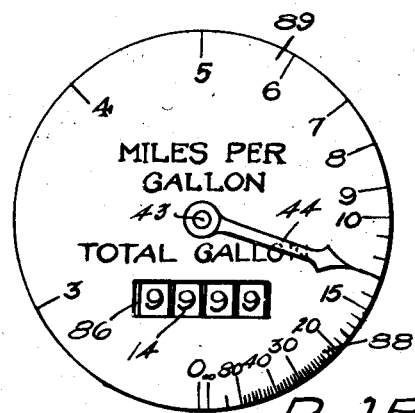
INVENTOR
Paul R. Gowen, deceased
Betty W. Gowen, Administratrix
BY
ATTORNEY Patented Sept. 8, 1942

2,294,901

UNITED STATES PATENT OFFICE 2,294,901

FUEL CONSUMPTION INDICATOR

Paul R. Gowen, deceased, late of Twin Falls, Idaho, by Betty Wilson Gowen, administratrix, Twin Falls, Idaho Application December 18, 1939, Serial No. 309,847

5 Claims. (Cl. 235—61)

(Granted under the act of March 3, 1883, as amended April 30, 1928; 370 O. G. 757)

This invention described herein may be manufactured and used by or for the Government for governmental purposes, without the payment to me of any royalty thereon.

This invention relates to a fuel consumption indicator, more particularly it is directed to a device of this character for showing the relation between the distance traveled by a vehicle and the fuel consumed for driving said vehicle.

One of the objects of the invention is to provide a fuel consumption indicator which is adapted to indicate instantly the gasoline or fuel mileage at any speed of a vehicle propelled by an internal combustion engine, whereby the economy of operation of the vehicle, the efficiency of different types of accessories, such as spark plugs, carbureters, piston rings, etc., used on the vehicle and the economy of using one type of fuel over another may be determined.

Another object of the invention is to provide an apparatus including means operated in proportion to the distance a vehicle travels and in proportion to the amount of fuel consumed during such travel.

Another object of the invention is to provide an efficient instrument of compact form which may be readily and quickly attached to any vehicle equipped with a speedometer for indicating the number of miles that the vehicle travels per unit of fuel used.

With the above and other objects and advantages in view, the invention consists of certain features of construction and operation of parts which will hereinafter appear and in which—

Fig. 1 is a fragmentary assembly view of the component parts used in carrying out the invention;

Fig. 2 is a fragmentary side elevation partly in section of a measuring and indicating mechanism including supporting plates;

Fig. 3 is a fragmentary detail view of a totalizing indicating means and its cooperating parts used in carrying out the invention;

Fig. 4 is a fragmentary perspective view of the measuring and indicating mechanism with the supporting plates shown in dotted outline;

Fig. 5 is a fragmentary detail of Fig. 4;

Fig. 6 is also a fragmentary detail of Fig. 4;

Fig. 7 is a perspective view of a modified form of the measuring and indicating mechanism;

Fig. 8 is a front elevation of a modified form of dial which may be used in carrying out the modified form of invention, illustrated in Fig. 7, and Fig. 9 is a front elevation of a portion of the invention.

In the illustrated embodiment characterizing the invention 1 indicates generally a metering device and 2 is an indicating mechanism associated therewith.

The metering device 1 which may be of any suitable type but is illustrated as being of the eccentric sliding vane type is connected into a fuel line between the fuel pump (not shown) and the carbureter (not shown) of an internal combustion engine by means of conduits 3 and 4 which are connected at their ends in communication with the metering device by means of fittings 5. Mounted within the metering device 1 is a rotor 6 provided with vanes 7. The metering device 1 is calibrated to deliver out through the conduit 4 to the carbureter (not shown) a definite portion of a gallon of fuel for each revolution of the rotor 6 and is connected in operative association with the measuring and indicating mechanism 2 by means of a flexible drive shaft 8 which is connected at one end to the rotor 6 of the metering device and suitably coupled at its other end to one end of a rigid shaft 9 provided in the measuring and indicating mechanism 2, as illustrated in Fig. 2.

The shaft 9 extends through a rear plate 10 and a main plate 11 of the measuring and indicating mechanism 2 and is rotatably mounted in a bearing 12 on the rear plate. On the inner end of the shaft 9 is fixedly mounted a gear 13 which is adapted to operate any suitable type of totalizing indicating mechanism 14, such as illustrated in Fig. 3 through a plurality of gears including a gear 15 which meshes with the gear 13 and is fixedly mounted on a shaft 16 which is in turn pivotally mounted at one end on the main plate 11 and at its other end on a plate 17. A pinion 18 is also fixed to the shaft 16 and meshes with a gear 19 fixedly mounted on one end of a shaft 20 which is in turn rotatably mounted on the plate 17 and a plate 21. The free end of the shaft 20 is formed with a worm 22 which meshes with a gear 23 mounted on one end of a shaft for the totalizing-indicating mechanism 14. The shaft for the indicating mechanism 14 is rotatably supported on a bracket 24, as illustrated in Fig. 2.

The gear 13 is also adapted to drive a plurality of cams 25, 26 and 27 through an idler gear 28 mounted on a shaft 29 which is pivotally mounted at its ends on the plate 17 and main plate 11, and through a gear 30 meshing with the idler gear 28.

The cams 25, 26 and 27 and the gear 30 are fixedly mounted on a shaft 31 which is pivotally mounted at its ends to the plates 17 and 21. The cam 25 has two indentations or cutout portions 32 formed therein which are 180° apart and adapted to operate a pawl 33 pivotally on a spindle 34 fixed at its ends to the plates 17 and 21. The cam 26 has two lobes or raised portions 35 formed thereon which are 180° apart and adapted to operate a rocker arm 36, having a stop 37 and a cam surface 38 provided thereon for a purpose which will hereinafter appear and the cam 27 also has two lobes or raised portions 39 formed thereon which are also 180° apart and adapted to operate a pawl 40 also pivotally mounted on the spindle 34 adjacent to the pawl 33.

One end of the pawl 33 is adapted to ride on the peripheral surface of the cam 25 and the other end thereof is provided with teeth 33' adapted to periodically engage a toothed measuring or metering wheel 41 having a vane 42 provided thereon which projects horizontally from one side of the measuring wheel in a rearward direction. The vane 42 is adapted to abut against the stop 37 formed on the rocker arm 36 when the measuring wheel 41 is at rest or at its starting position during a period in the operation of the mechanism.

The measuring wheel 41 is rotatably mounted on a shaft 43 having a pointer 44 fixed to its outer end. The pointer shaft 43 is rotatably mounted on the plate 17 and in a bearing 45 provided on the plate 21, as illustrated in Fig. 2.

One end of the pawl 40 is adapted to ride on the peripheral surface of the cam 27 and its other end is provided with ratchet teeth 46 which are adapted to periodically engage a fine tooth ratchet indicating wheel 47 fixedly mounted on the pointer shaft 43 adjacent to its inner end. A pin 48 is provided on the indicator wheel 47 which projects outwardly from one side of the indicating wheel toward the measuring wheel 41 and is adapted to abut against the upper surface of the vane 42 on the measuring wheel when the indicating wheel is at rest or at its starting position. The teeth 46 on the pawl 40 are adapted to engage the ratchet teeth on the indicating wheel 47 in such a manner as to allow rotation of the indicating wheel only in a clockwise direction, as indicated by the arrow.

One end of rocker arm 36 is adapted to ride on the peripheral surface of the cam 26 and is pivotally mounted at its other end on a shaft 49 to be more fully hereinafter described. A fine tooth pinion 50 is provided which is rotatably mounted on the rocker arm and fixedly connected to a shaft 51. The pinion 50 is adapted to mesh with the measuring wheel 41 for driving the measuring wheel and the shaft 51 extends through the rocker arm, said shaft being mounted on the plates 17 and 21 in any suitable manner for movable engagement therewith, whereby upon movement of the rocker arm the pinion may be moved into mesh with and out of mesh with the measuring wheel.

An adapter 52, illustrated in Fig. 1, is provided which is connected to a speedometer coupling 53 and interposed between the speedometer indicated at 54 and the speedometer drive shaft 55. The adapter 52 comprises a T-coupling with two shafts 56 and 57 provided at their inner ends with bevel gears 58 and 59 respectively which are fitted with bearings 60. The bevel gears 58 and 59 mesh with each other and are inclosed within body portions 61 and 62. The shafts 56 and 57 are coupled with the measuring and indicating mechanism 2 through a flexible drive shaft 63.

The drive shaft 63 is coupled at 64 to a vertically extending shaft 65 which is rotatably mounted in the lower portion of the measuring and indicating mechanism 2 and provided with a worm 66 adapted to drive the pinion 50 through a gear train, including a gear 67 meshing with the worm 66 and fixably mounted on one end of a shaft 68 pivotally connected at its ends on the plates 17 and 21. A gear 69 is fixedly mounted on the other end of the shaft 68 and is adapted to mesh with a reversing gear 70 rotatably mounted on a suitable rocker 71, capable of freely turning on a pivot 72 secured to the plate 21. The reversing gear 70 is always in mesh with a second reversing gear 73 rotatably mounted on the other end of the rocker 71.

The reversing gears 70 and 73 are provided for assuring a constant direction of rotation of the pinion 50 for driving the measuring wheel 41 regardless of the direction of rotation of the worm 66 on the shaft 65 coupled to the drive shaft 63 and the reversing gears are adapted to separately mesh with a gear 74, rotatably mounted on the fixed shaft 49. The gear 74 meshes with a gear 75 fixedly mounted on the same shaft 51 to which the pinion 50 is connected.

A set screw 76 is provided as a stop to limit the movement of the rocker arm 36 and wire springs 77, 77', 77'' and 77''' are provided for holding the rocker arm and the pawls 33 and 40 in contact with the cams 25, 26 and 27.

The zero position of the measuring wheel 41 is with its vane 42 against the stop 37 on the rocker arm 36 and the zero position of the indicating wheel 47 is with its pin 48 against the upper surface of the vane 42 on the measuring wheel, as shown in Figs. 4 and 6. In order to return the measuring wheel 41 and indicating wheel 47 to a zero position, coil springs 78 and 79 respectively are provided. One end of the coil spring 78 is secured to the measuring wheel 41 and the other end to the plate 21 at 80, and one end of the coil spring 79 is connected to the indicating wheel 47 and the other end thereof is connected at 81 to the plate 17.

The plates 11, 17 and 21 are held apart by bolts 82 and facilitate the mounting of the gear wheels of the measuring and indicating mechanism 2 and totalizing indicating mechanism 14. The plates 10 and 11 are provided with screw holes 83 for attachment to an instrument case 84. The case 84 is provided with a uniformly spaced dial 85 marked off in miles per gallon of fuel used and has a window 86 provided therein for viewing the totalizing indicating mechanism 14 through the dial 85.

In Figs. 7 and 8 is disclosed a modified form of the invention which consists of the same principal parts as the fuel consumption indicator above described, its difference being in the fact that the drives are reversed. In this design the drive shaft 63 from the adapter 52, as illustrated in Fig. 1, is caused to drive the cams 25', 26' and 27' and the drive shaft 8 driven by the rotor 6 of the metering device 1 is caused to drive the measuring wheel 41 whereby the gallons of fuel used per mile traveled by the vehicle is measured which is transposed to miles per gallon by any suitable type graduations 88 on the dial 89, illustrated in Fig. 8.

As in the first mentioned device the flexible drive shaft 8 from the metering device 1 extends through the rear plate 10 of the casing 84, shown in Fig. 2, and drives the gear 13, which drives the totalizing indicating mechanism 14 through the gear 15, pinion 18, gear 19, shaft 20, worm 22 on the outer end of the shaft 20 and the gear 23 on the totalizing indicating mechanism. The gear 13 in this form of the invention directly drives the gear 30 without the intermediate idler gear 28, as in the first mentioned device. A gear 90 is fixedly mounted on the other end of the shaft 31 whereby the gear 90 is driven upon the operation of the gear 30. The gear 90 meshes with the gear 75 fixedly mounted on the shaft 51 whereby the pinion 50 also mounted on the shaft 51 is rotated to drive the measuring wheel 41 in a counter-clockwise direction, as indicated by the arrow.

The upper end of the rocker arm 36 is pivoted on the shaft 31 and the lower end thereof is adapted to bear against the peripheral surface of the cam 26'. The shaft 51 which is movably mounted on the plates 17 and 21 extends through the rocker arm 36 and is adapted to move with the rocker arm upon the operation thereof, thus moving the pinion 50 into and out of mesh with the measuring wheel, as in the first mentioned device.

The cam driver is taken off of the adapter 52 and turns the worm 66 through the shaft 65 on the lower end of the measuring and indicating mechanism. The worm 66 meshes with the gear 67 fixedly mounted on the shaft 68. Also fixedly mounted on the shaft 68 are cams 25', 26' and 27' which are of the same construction as the cams 25, 26 and 27, described in the first mentioned device, except only one lobe or raised portion is provided on the cams 26' and 27' instead of two as on the cams 26 and 27 above mentioned, and only one indentation or cutout portion 32 is provided on the cam 25' instead of two as in the cam 25. The indentation 32 and lobe 39 are formed on the cams 25' and 27' respectively 180° from the lobe 35 on the cam 26'. The cam 26' controls the operation of the rocker arm 36 and cams 25' and 27' control the operation of the measuring wheel holding pawl 33" and the indicating wheel holding pawl 40'.

In the operation of the first described form of invention, the drive shaft 63 is caused to be driven by the speedometer drive shaft 55 through the T-coupling 52 which causes the worm 66 of the measuring and indicating mechanism 2 to rotate say in a counter-clockwise direction, as indicated by the arrow in Fig. 4, whereby the gear 67 meshing with the worm is caused to rotate in a clockwise direction, thus causing the gear 69 mounted on the same shaft 68 as the gear 67 to rotate in the same direction which in turn rotates the reversing gear 70 mounted on the rocker 71 in a counter-clockwise direction. The reversing gear 70 rotates the gear 74 in a clockwise direction which in turn rotates the gear 75 in a counter-clockwise direction, thus rotating the pinion 50 in the same direction, whereby the measuring wheel 41 in mesh with the pinion 50 is caused to rotate in a clockwise direction. Should the drive shaft 63, and hence the shaft 65 and worm 66, be driven in a reversed or clockwise direction, thereby causing the rotation of the gears 67 and 69 in a counter-clockwise direction, the action of the gear 69 on the reversing gear 70 would be such as to cause the rocker 71 to turn on its pivot 72, thus withdrawing the reversing gear 70 out of mesh with the gear 74 and causing the reversing gear 73 on the other end of the rocker to mesh with the gear 74 to rotate the gear in the same direction as before, or in a clockwise direction to also rotate the gear 75 and thus the pinion 50 in the same direction to drive the measuring wheel 41 in a clockwise direction as before.

Since the flexible drive shaft 63 is connected to the speedometer drive shaft 55 which is in turn connected to the vehicle and rotates in proportion to the distance traveled by the vehicle, the revolutions of the worm 66 are proportioned to the distance traveled by the vehicle, whereby the pinion 50 is also driven through its connection with the worm a distance proportional to the distance traveled by the vehicle. Assuming that the worm 66 makes $r$ revolutions per mile, then in $1/m$ miles, where $m>1$, the worm 66 makes $r/m$ revolutions. This is geared down until the measuring wheel driver pinion 50 makes 1 revolution for $r/m$ revolutions of the worm 66.

The fuel which is fed from the fuel pump (not shown) to the carburetor (not shown) of the vehicle is caused to enter the metering device 1 which is accurately calibrated to deliver a definite portion of a gallon of fuel for each revolution of the rotor 6. Upon the rotation of the rotor 6 of the metering device in a counter-clockwise direction, as indicated by the arrow, the gear 13 of the measuring and indicating mechanism is caused to rotate in the same or in a counter-clockwise direction as the rotor 6 through the drive shaft 8, which in turn caused the gear 13 to rotate the gear 15 in a clockwise direction. The pinion 18 mounted on the same shaft 16 with the gear 15 is rotated in the same direction as the gear 15 which rotates the gear 19 in a counter-clockwise direction, thus rotating the shaft 20 which is connected to the gear 19, and operating the totalizing indicating mechanism 14 through the worm 22 on the outer end of the shaft 20 and the gear 23 on the totalizing indicating mechanism which in turn operates the totalizing mechanism. In its operation the gear 13 also rotates the cams 25, 26 and 27 in a counter-clockwise direction, as indicated by the arrow, through the idler gear 28 meshing with the drive gear 30.

Assuming that the cams 25, 26 and 27 are being rotated with the upper end of the rocker arm 36 in contact with the peripheral surface of the cam 26 and the pawls 33 and 40 in contact with the peripheral surface of the cams 25 and 27 respectively and with the pinion 50 in mesh with the measuring wheel 41, upon the upper end of the rocker arm 36 striking a lobe or raised portion 35 on the cam 26, the rocker arm is moved outwardly about its pivotal connection with the shaft 49 against the action of the spring 11, whereby the pinion 50 is withdrawn out of mesh with the measuring wheel 41. The pinion 50 remains in mesh with the measuring wheel 41 only when the outer end of the rocker arm 36 rides on the low portions 87 of the cam 26.

The cam 26 and the gears 28 and 30 are so designed that ½ revolution of the rotor 6 of the fuel metering device 1 is required to allow the outer end of the rocker arm 36 to ride on one low portion 87 of the cam 26 between the lobes 35 thereof before striking a lobe 35 on the cam 26 to cause the pinion 50 to be moved out of mesh with the measuring wheel 41. Now if the metering device 1 has a capacity of 1/*g* gallons of fuel per revolution of the rotor 6 where *g*>1. the driving pinion 50 is engaged with the measuring wheel 41 for the length of time that is required for ½*g* gallons of fuel to be forced through the metering device by the vanes on the rotor 6.

Since the revolutions of the measuring wheel driving pinion 50 are proportional to the distance traveled by the vehicle and the length of time it is engaged with the measuring wheel 41 is proportional to the gallons of fuel used by the vehicle, the resultant angular displacement of the measuring wheel 41 is proportional to the miles traveled per gallon of fuel.

While the rocker arm 36 is riding on the low portions 87 of the cam 26, the outer end of the measuring wheel holding pawl 33 engages the peripheral surface on the cam 25, or in other words is cammed up out of an indentation 32 and the teeth 33' on the inner end of the pawl 33 are caused to disengage from the measuring wheel 41. This action of the cam 26 on the rocker arm allows the pinion 50 to remain in mesh with the measuring wheel to rotate the measuring wheel and through the vane 42 provided on the measuring wheel and the pin 48 on the indicating wheel 47, the indicating wheel is carried around with the measuring wheel 41, thus rotating the shaft 43 on which the indicating wheel 47 is mounted and causing the pointer 44 on the outer end of the shaft to move about the dial 85 to indicate miles per gallon of fuel used for the distance traveled by the vehicle.

The outer end of the indicating wheel pawl 40 is adapted to ride on the peripheral surface of the cam 27 with the ratchet teeth 46 on the inner end thereof in engagement with the ratchet teeth on the indicating wheel. The ratchet teeth 46 on the pawl 40 are adapted to engage the teeth on the indicating wheel in such a manner as to allow the indicating wheel to rotate only in a clockwise direction, as indicated by the arrow.

The rocker arm 36 when cammed up by a lobe 35 on the cam 26, the outer end of the measuring wheel holding pawl 33 is caused to engage in an indentation or cutout portion 32 formed in the cam 25, thus camming down the pawl 33 and causing the teeth 33' on its lower end to engage with the measuring wheel 41 to hold the measuring wheel in a stopped position, immediately thereafter the outer end of the indicating wheel holding pawl 40 is caused to be engaged by a lobe 39 on the cam 27, thus camming up the pawl 40 and disengaging the teeth 46 on the lower end thereof from the indicating wheel 47, which allows the coil spring 79 to position pin 48 against the vane 42 on the measuring wheel. The indicating wheel holding pawl 40 is then cammed down after passing a lobe 39 on the cam 27, thus causing the teeth 46 of the pawl 40 to reengage with the teeth on the indicating wheel 47. The measuring wheel holding pawl 33 then engages in an indentation 32 on the cam 25 which causes the teeth 33' on the pawl 33 to be engaged with the measuring wheel. The pawl 33 is then cammed up after having engaged in an indentation 32 on the cam 25, thereby releasing the measuring wheel 41 which is then caused to return to its zero position by means of the coil spring 78 with the vane 42 of the measuring wheel abutting against the stop 37 on the rocker arm 36. The rocker arm 36 is again caused to be cammed down which causes the pinion 50 to mesh with the measuring wheel and a new measurement begins. If the new measurement is greater than the old measurement, the indicating wheel 47 will be carried around by the measuring wheel by means of the vane 42 on the measuring wheel contacting with the pin 48 on the indicating wheel. If the new measurement is less than the old measurement and the pawl 40 is disengaged from the indicating wheel 47, the indicating wheel will swing back to a position under the action of its coil spring 79 with its pin 48 abutting against the vane 42 on the measuring wheel.

It will thus be seen that in this form of the invention if the vehicle is standing still with the motor running there will be no movement of the measuring wheel driver pinion to rotate the measuring wheel 41 and thus the indicating wheel 47 and hence the pointer 44 will show zero miles per gallon on the dial 85. On the other hand if the vehicle is coasting, the pinion 50 on the rocker arm 36 will be operated by the cam 26 into mesh with the measuring wheel 41 due to the fuel consumption at idling speed and will remain in mesh with the measuring wheel (unless the fuel supply is cut off and the engine stops with the rocker arm 36 in a cammed up position, in which case the measuring and indicating wheels will be carried through 360° or until the vane 42 on the measuring wheel strikes the cam surface 38 on the rocker arm, whereby the rocker arm is forced outwardly to disengage the drive pinion 50 from the measuring wheel and the pointer 44 connected on the shaft 43 and operated by the indicating wheel will then hover around the maximum reading on the dial 85). Other conditions of motion with power on will cause a displacement somewhere between these extremes.

The above described mechanism may be designed to give readings at any desired time interval at any speed of the vehicle. For example, the mechanism may be designed to give readings every second at 60 miles per hour, at 15 miles per gallon of fuel. In this case a reading at 30 miles per hour will require two seconds and at 15 miles per hour four seconds.

In the operation of the modified form of the invention, illustrated in Figs. 7 and 8, assuming that the vehicle is moving with power on, the flow of fuel to the carbureter (not shown) through the metering device 1, will cause the rotor 6 of the metering device to rotate, turning the flexible shaft 8, as illustrated in Fig. 1, which in turn rotates the gear 13 which causes the measuring wheel 41 to turn in a counter-clockwise direction as indicated by the arrow, through the action of the gears 30, 90, 75 and the measuring wheel driving pinion 50, thereby causing a displacement of the measuring wheel 41 and through its connection with the indicating wheel 47, the indicating wheel is rotated in a counter-clockwise direction which rotates the shaft 43 and hence the pointer 44 about the dial 89 to indicate the miles per gallon of fuel used.

This angular displacement of the measuring and indicating wheels 41 and 47 respectively will continue until the lower end of the rocker arm 36 rides up on the lobe 35 of the cam 26', whereby the measuring wheel holding pawl 33" engages in an indentation 32 on the cam 25', thereby causing the teeth 33' on the upper end of the pawl to engage with the measuring wheel 41 to hold the measuring wheel in a stopped position. Immediately thereafter the lower end of the indicating wheel holding pawl 40' is engaged by the lobe 39 on the cam 27' which causes the pawl 40' to move about its pivotable connection with the spindle 34 and to disengage its teeth 46 from the indicating wheel 47 whereby the indicating wheel is permitted under the action of the coil spring 79 to take a position with its pin 48 against the vane 42 of the measuring wheel. The lower end of the measuring wheel holding pawl 33'' is then disengaged from the indentation 32 on the cam 25', whereby the pawl is cammed up disengaging the teeth 33' on the upper end thereof from the measuring wheel 41 and allowing the measuring wheel under the action of its coil spring 78, to return to its zero position with its vane 42 against the stop 37 on the rocker arm 36. Then the lower end of the rocker arm 36 is disengaged from the lobe 35 on the cam 26', whereby the rocker arm is cammed down permitting the pinion 50 on the rocker arm to reengage with the measuring wheel 41 for a new measurement. If the succeeding displacement of the measuring wheel is greater than the first displacement, the indicating wheel 47 will be carried around to its new position, thus moving the pointer 44 on the dial 89. The ratchet teeth 46 on the upper end of the indicating wheel holding pawl 40' engages the teeth on the indicating wheel 47 in such a manner as to permit movement of the indicating wheel only in a counter-clockwise direction, as indicated by the arrow. If the succeeding displacement of the measuring wheel 41 is less than the first displacement, the measuring wheel will stop short of its former position. In this case when the pawl 40' is released the indicating wheel, under tension of its coil spring 79 will return to a position with its pin 48 against the vane 42 of the measuring wheel 41.

Since the angular displacement of the measuring wheel 41 by its drive pinion 50 is proportional to the number of revolutions of the rotor 6 of the metering device 1, or in other words to the quantity of fuel flowing through the metering device and since the period of contact of the drive pinion 50 with the measuring wheel is determined by the rocker arm under the action of the cam 26' whose rotation is proportional to the distance traveled by the vehicle, the resultant displacement of the measuring and indicating wheels is proportional to the quantity of fuel used per fixed distance traveled. By calculating the capacity of the metering device 1 and the ratios of the gears this may be made into the number of gallons of fuel used per mile the vehicle travels. Since the measuring wheel 41 is controlled by the quantity of fuel used the smaller the displacement of the measuring wheel per unit distance traveled the greater the mileage obtained. For this reason if the dial 89 in Fig. 8 is to read in a clockwise direction, the measuring wheel 41, indicating wheel 47 and pointer 44 on the end of the shaft 43 must move in a counter-clockwise direction. Should the vehicle be standing still, engine running, there will be a flow of fuel and a counter-clockwise displacement of the measuring and indicating wheels 41 and 47 respectively. Since the vehicle is stationary there will be no movement of the cam 26' and hence the lower end of the rocker arm 36 will not be actuated by the lobe 35 on the cam 26' and the drive pinion 50 on the rocker arm will remain in mesh with the measuring wheel 41 until the vane 42 on the measuring wheel strikes the cam surface 38 on the rocker arm 36 which causes the rocker arm to be moved outwardly on its pivot and the drive pinion 50 is disengaged from the measuring wheel. At this point the pointer 44 on the shaft 43 will indicate on the dial 89 zero miles per gallon. If, on the other hand, the vehicle is coasting, there will be no displacement of the measuring wheel 41, the cam 26' will rotate and the pointer 44 will show a maximum reading. The normal rest position of the pointer 44 is shown by the 00 position on the dial 89. Other conditions of motion with power on will give readings on the dial 89 between these extremes.

It will thus be seen that there is provided a highly novel and useful form of fuel consumption indicator for vehicles which is well adapted for all the purposes indicated. Even though there has herein been described certain features of construction and operation of parts, it is nevertheless to be understood that various changes may be made therein without departing from the spirit or scope of the invention.

Having described the invention of Paul R. Gowen, what is claimed as new is:

1. A device for automatically determining the ratio between the rotations of the two rotating members, rotating at variable speeds, comprising in combination a measuring element, means directly connected to one of said rotating members, means including a gear operated cam set directly connected with the other of said rotating members and continuously rotating at varying speeds to actuate periodically a portion of said first mentioned means into direct engagement with said measuring element, for operating the measuring element proportionately to the rotative speed of said first mentioned rotating member, also to hold the portion of said means in engagement with the measuring element for a predetermined period during the operation of said second mentioned rotating member and to move the portion of said first mentioned means out of engagement with said measuring element during other periods in the operation of said last mentioned rotating member and means including a pointer actuated by said measuring element.

2. A device for automatically determining the ratio between the rotations of two rotating members, rotating at variable speeds, comprising in combination a measuring element, means directly connected to one of said rotating members, means including a gear operated cam set directly connected with the other of said rotating members and continuously rotating at varying speeds to actuate periodically a portion of said first mentioned means into direct engagement with said measuring element for operating the measuring element proportionately to the rotative speed of said first mentioned rotating member, also to hold the portion of said means in engagement with said measuring element for a predetermined period during the operation of said second mentioned rotating member and to move the portion of said first mentioned means out of engagement with said measuring element during other periods in the operation of said last mentioned rotating member, means including a pointer actuated by said measuring element during the operation thereof, and means for returning said last mentioned means, pointer and measuring element to their starting position.

3. A device for automatically determining the ratio between the rotations of two rotating members, rotating at variable speeds, comprising in combination a toothed measuring element, means including a rocker arm having a pinion thereon directly connected to one of said rotating members, means including a gear operated cam set directly connected with the other of said rotating members and continuously rotating at varying speeds to actuate periodically said rocker arm to move said pinion into direct engagement with said toothed measuring element for operating the measuring element proportionately to the rotative speed of said first mentioned rotating member, also to hold said pinion in engagement with the measuring element for a predetermined period during the operation of said second mentioned rotating member and to move said pinion out of engagement with said measuring element during other periods in the operation of said last mentioned rotating member and means including a pointer actuated by said measuring element.

4. A device for automatically determining the ratio between the rotations of two rotating members, rotating at variable speeds, comprising in combination toothed measuring and indicating elements, means including a rocker arm having a pinion thereon directly connected to one of said rotating members, dual pawls pivotally mounted on said device, means including a trio of continuously rotating gear operated cams directly connected with the other of said rotating members and operating simultaneously at varying speeds, two of said cams adapted to simultaneously actuate said pawls at spaced intervals, one of said pawls being actuated into and out of engagement with said measuring element and the other of said pawls adapted to be actuated into and out of engagement with said indicating element during certain periods in the operation of said two first mentioned cams, and the other of said cams adapted to actuate said rocker arm to move said pinion into direct engagement with said toothed measuring element for operating the same proportionately to the rotative speed of said first mentioned rotating member, also to hold said pinion in engagement with the measuring element for a predetermined period during the operation of said second mentioned rotating member and to move said pinion out of engagement with said measuring element during other periods in the operation of said last mentioned rotating member, said indicating element actuated by said measuring element, a pointer actuated by said indicating element, and means for returning the measuring and indicating elements including the pointer to their starting position.

5. A device for automatically determining the ratio between the rotations of two members, rotating at variable speeds, comprising in combination, toothed measuring and indicating elements, means including a rocker arm having a pinion thereon directly connected to one of said rotating members, pivotally mounted dual pawls coacting with the measuring and indicating elements, one of said pawls being normally in disengaged relation with respect to said measuring element but operable into engagement therewith to lock said element against rotary movement, the other of said pawls being normally in engagement with the indicating element to prevent retrograde movement thereof, but operable to disengage said element, means including a trio of continuously rotating cams directly connected with the other of said rotating members and operating simultaneously at varying speeds, two of said cams adapted to actuate said pawls simultaneously and at spaced intervals from their normal positions, to lock said measuring and release said indicating element, the other of said cams adapted to actuate said rocker arm to move said pinion into direct engagement with said toothed measuring element for operating the same proportionately to the rotative speed of said first mentioned rotating member, also to hold said pinion in engagement with the measuring element for a predetermined period during the operation of said second mentioned rotating member and to move said pinion out of engagement with said measuring element during other periods in the operation of said last mentioned rotating member, said indicating element actuated by said measuring element, and a pointer operated by said indicator element.

BETTY WILSON GOWEN,
*Administratrix of the Estate of Paul R. Gowen, Deceased.*